A. O. HUBBARD.
WHEELBARROW.
APPLICATION FILED JULY 31, 1909.
961,719.
Patented June 14, 1910.
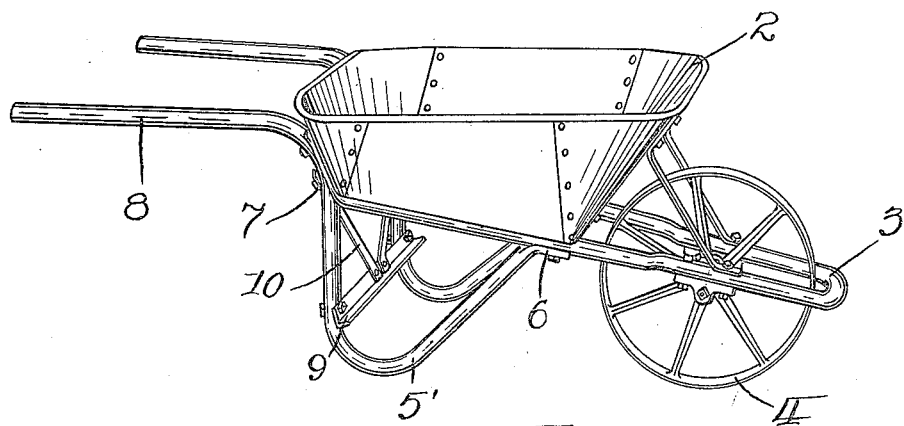
Fig. 1.
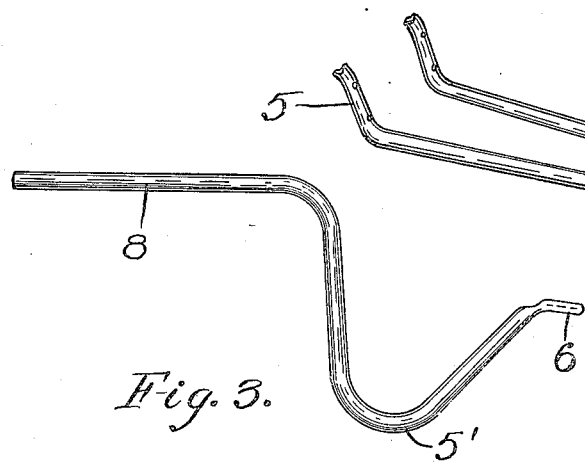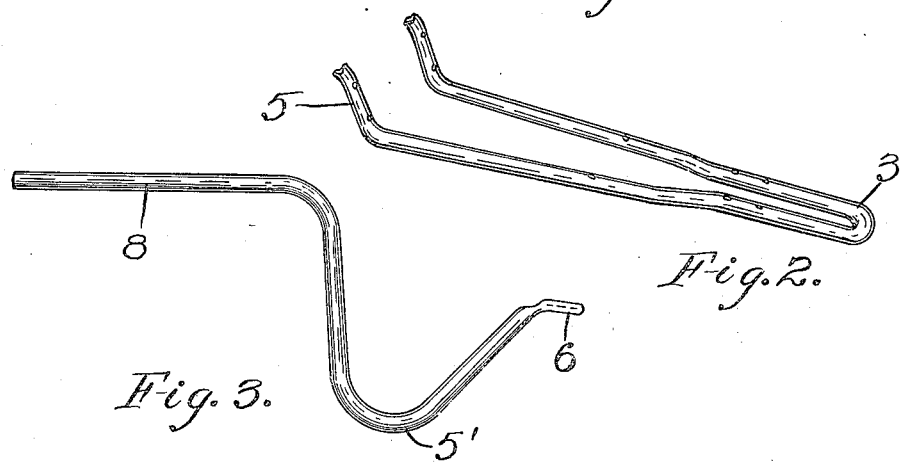
Fig. 2.
Fig. 3.
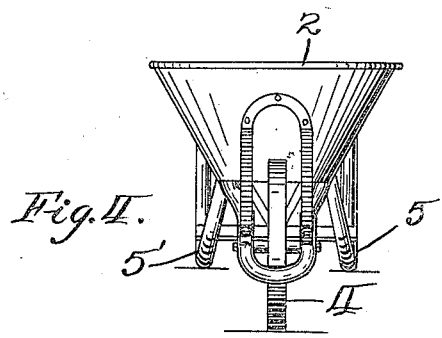
Fig. 4.
Witnesses:
Inventor:
Arthur O. Hubbard,
by Paul & Paul
His Attorneys.

UNITED STATES PATENT OFFICE.

ARTHUR O. HUBBARD, OF MINNEAPOLIS, MINNESOTA.

WHEELBARROW.

961,719.  Specification of Letters Patent.  Patented June 14, 1910.

Application filed July 31, 1909.  Serial No. 510,628.

*To all whom it may concern:*

Be it known that I, ARTHUR O. HUBBARD, of Minneapolis, Hennepin county, Minnesota, have invented certain new and useful Improvements in Wheelbarrows, of which the following is a specification.

The object of my invention is to provide a wheelbarrow of inexpensive construction and one that will be extremely strong and durable, the legs and handle bars being combined or formed in one piece on each side of the barrow, so that the strain of carrying will be thrown well forward toward the wheel and the push exerted on the handle bars will also be transmitted lengthwise through the frame toward the forward portion thereof.

A further object is to provide wheel barrow legs, which will not dig or sink into soft soil or sod, thus adapting the barrow particularly for garden and lawn use.

The invention consists generally in various constructions and combinations, all as hereinafter described and particularly pointed out in the claims.

In the accompanying drawing, forming part of this specification, Figure 1 is a perspective view of a wheel barrow, embodying my invention, Fig. 2 is a similar view of the frame of the barrow, Fig. 3 is a detail view of one of the handle bars and the leg, Fig. 4 is a front view of the barrow.

In the drawing, 2 represents the barrow tray, 3 the frame having bearings at its forward end for a wheel 4 and provided with turned up rear ends 5, which are secured to the rear wall of the tray. This frame is preferably made of tubing and the legs 5' are also of tubing bent into a U-shape and having ends 6 that are secured to the sides of the frame 3 under the forward portion of the tray. The lower portion of each leg is rounded to present a long, curved bearing surface to rest upon the ground and is secured at 7 to the rear wall of the tray and from this point handle bars 8 extend rearwardly and form integral continuations of the legs. The cross bar 9 connects the legs under the tray and is provided with braces 10. The legs and the handle bars may be made of any suitable weight of tubing and the manner of fastening the tubing to the rear of the tray or the frame of the barrow insures the equal distribution of the weights when the barrow is loaded and also allows the person wheeling the barrow to apply the propelling force in line with the barrow frame and at points where it will be most effective on the wheel.

I claim—

1. A wheel barrow comprising a frame having side sections with a space between them, and a loop at the forward end of said frame connecting said side sections, a tray seated on said sections and secured to the rear ends thereof, handle bars having U-shaped forward portions, the forward section of each U-shaped portion being secured to said frame under said tray, and the rear section of said U-shaped portions being secured to the rear portion of said tray and to said frame, said U-shaped portions forming legs for the barrow, and a brace bar secured to said U-shaped portions and bridging the space between them, substantially as described.

2. A barrow comprising a frame of tubing provided with a loop at its forward end and a space between the sides of said loop of sufficient width to receive a wheel, the ends of the tubing comprising said frame being upwardly turned, a tray adapted to rest on said frame and secured thereto and to said upwardly turned ends, handle bars, also composed of tubing, having U-shaped forward portions forming legs for the barrow, the forward ends of said U-shaped portions being secured to said frame under the barrow, and the rear sections of said U-shaped portions being bolted to said tray through the upwardly turned ends of said frame, and a bracing means for said U-shaped portions.

In witness whereof, I have hereunto set my hand this 9th day of July 1909.

ARTHUR O. HUBBARD.

Witnesses:
J. M. SULLIVAN,
J. A. BYINGTON.